(12) United States Patent
Harada et al.

(10) Patent No.: US 12,219,533 B2
(45) Date of Patent: Feb. 4, 2025

(54) USER TERMINAL UTILIZING HIGH FREQUENCY BAND AND MONITORING INTERVAL BASED ON SAID FREQUENCY BAND

(71) Applicant: NTT DOCOMO, INC., Tokyo (JP)

(72) Inventors: Hiroki Harada, Tokyo (JP); Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 460 days.

(21) Appl. No.: 17/595,421

(22) PCT Filed: May 17, 2019

(86) PCT No.: PCT/JP2019/019727
§ 371 (c)(1),
(2) Date: Nov. 16, 2021

(87) PCT Pub. No.: WO2020/234932
PCT Pub. Date: Nov. 26, 2020

(65) Prior Publication Data
US 2022/0201666 A1    Jun. 23, 2022

(51) Int. Cl.
*H04W 72/044*     (2023.01)
(52) U.S. Cl.
CPC .................... *H04W 72/044* (2013.01)
(58) Field of Classification Search
CPC ............ H04W 72/044; H04W 72/0453; H04L 5/0094; H04L 5/0044; H04L 5/0007
See application file for complete search history.

(56) References Cited

U.S. PATENT DOCUMENTS

| | | | |
|---|---|---|---|
| 2018/0255468 A1 | 9/2018 | Huang et al. | |
| 2019/0123992 A1* | 4/2019 | Ly | H04W 24/10 |
| 2020/0119965 A1 | 4/2020 | Harada et al. | |
| 2020/0374873 A1* | 11/2020 | Tiirola | H04W 72/23 |
| 2021/0120506 A1 | 4/2021 | Takeda et al. | |

FOREIGN PATENT DOCUMENTS

| | | |
|---|---|---|
| JP | 2019503113 A | 1/2019 |
| WO | 2018/220854 A1 | 12/2018 |
| WO | 2019021490 A1 | 1/2019 |

OTHER PUBLICATIONS

Extended European Search Report issued in counterpart European Application No. 19929280.6 mailed on Apr. 4, 2023 (16 pages).
3GPP TR 38.912 V1.0.0; "3rd Generation Partnership Project; Technical Specification Group Radio Access Network; Study on New Radio (NR) Access Technology (Release 14)"; Mar. 2017 (73 pages).

(Continued)

*Primary Examiner* — Peter G Solinsky
(74) *Attorney, Agent, or Firm* — Osha Bergman Watanabe & Burton LLP

(57) ABSTRACT

A user terminal, when using a high frequency band having a frequency higher than a certain frequency band including one or a plurality of frequency ranges, increases number of symbols constituting one slot. The user terminal transmits and receives signals by using the slot with the increased number of symbols.

2 Claims, 10 Drawing Sheets

(56) References Cited

OTHER PUBLICATIONS

Etsi et al; "5G; Study on New Radio (NR) access technology"; ETSI TR 138 912 V15.0.0, pp. 1-76; Sep. 2018 (76 pages).
3GPP TSG RAN WG1 #97; R1-1907158 "Design of initial access signals and channels for NR-based access to unlicensed spectrum" AT&T; Reno, USA; May 13-17, 2019 (4 pages).
International Search Report issued in International Application No. PCT/JP2019/019727, mailed Nov. 26, 2019 (5 pages).
Written Opinion issued in International Application No. PCT/JP2019/019727; Dated Nov. 26, 2019 (4 pages).
3GPP TR 38.807 V0.1.0 "3rd Generation Partnership Project; Technical Specification Group Radio Access Network; Study on requirements for NR beyond 52.6 GHz (Release 16)" Mar. 2019 (43 pages).
Office Action issued in the counterpart Japanese Patent Application No. 2021-520504, mailed on Feb. 21, 2023 (6 pages).
Partial Supplementary European Search Report issued in European Patent Application No. 19929280.6, mailed on Dec. 13, 2022 (14 pages).
Extended European Search Report issued in counterpart European Application No. 23206970.8 mailed on Feb. 7, 2024 (8 pages).

* cited by examiner

□ :CORESET
▨ :DMRS
▨ :PDSCH

□ :CORESET
▨ :DMRS
▨ :PDSCH

USER TERMINAL UTILIZING HIGH FREQUENCY BAND AND MONITORING INTERVAL BASED ON SAID FREQUENCY BAND

TECHNICAL FIELD

The present invention relates to a user terminal corresponding to a high frequency band.

BACKGROUND ART

The 3rd Generation Partnership Project (3GPP) specifies Long Term Evolution (LTE), and with the aim of further speeding, specifies LTE-Advanced (hereinbelow, the LTE includes the LTE-Advanced). In the 3GPP, specifications for 5th generation mobile communication system (5G, also called as New Radio (NR) or Next Generation (NG)) are also being considered.

In Release 15 and Release 16 (NR) of the 3GPP, the operation up to 52.6 GHz is specified. In addition, in the specifications for Release 16, operation in a band exceeding 52.6 GHz has been studied (see Non-Patent Document 1). The target frequency range in Study Item (SI) is 52.6 GHz to 114.25 GHz.

When the carrier frequency is very high, an increase in phase noise and propagation loss becomes a problem. It is also more sensitive to peak-to-average power ratio (PAPR) and power amplifier nonlinearity.

In order to solve such a problem, CP-OFDM/DFT-S-OFDM having a larger Sub-Carrier Spacing (SCS) can be considered when a band exceeding 52.6 GHz is used. The OFDM (Orthogonal Frequency Division Multiplexing) has a high PAPR.

On the other hand, the larger the SCS, the shorter the symbol/Cyclic Prefix (CP) period and the slot period (when the configuration of 14 symbols/slot is maintained).

PRIOR ART DOCUMENT

Non-Patent Document

Non-Patent Document 1: 3GPP TR 38.807 V0.1.0, 3rd Generation Partnership Project; Technical Specification Group Radio Access Network; Study on requirements for NR beyond 52.6 GHz (Release 16), 3GPP, March 2019

SUMMARY OF THE INVENTION

However, the short slot period as described above may cause the following problems. Specifically, if the same user terminal (User Equipment, UE) is scheduled in multiple consecutive slots, when the UE needs to start processing the second slot, the processing of the first slot may not have completed.

In other words, if the slot period is too short, the UE is forced to perform parallel processing, causing an increase in the cost, complexity, and power consumption of the UE.

Therefore, the present invention has been made in view of the above discussion. One object of the present invention is to provide a user terminal capable of suppressing an increase in the cost, complication, power consumption even when a high frequency band exceeding 50 GHz is used.

According to one aspect of the present invention a user terminal (UE 200) includes a control unit (control unit 270) that, when using a high frequency band (FRx) having a frequency higher than a certain frequency band including one or a plurality of frequency ranges (FR1, FR2), increases number of symbols constituting one slot than when using the certain frequency band; and a transmitting and receiving unit (radio signal transmitting and receiving unit 210) that transmits and receives signals by using the slot with the increased number of symbols than when using the certain frequency band.

According to another aspect of the present invention a user terminal (UE 200) includes a control unit (control unit 270) that, when using a high frequency band having a frequency higher than a certain frequency band including one or a plurality of frequency ranges, increases a monitoring interval of a physical downlink control channel (PDCCH) than when using the certain frequency band; and a receiving unit (data transmitting and receiving unit 260) that receives the physical downlink control channel based on the monitoring interval that is larger than when using the certain frequency band.

According to still another aspect of the present invention a user terminal (UE 200) includes a control unit (control unit 270) that, when using a high frequency band having a frequency higher than a certain frequency band including one or a plurality of frequency ranges, maps one transport block to a plurality of slots; and a transmitting unit (data transmitting and receiving unit 260) that transmits the transport block mapped to the plurality of slots.

According to still another aspect of the present invention a user terminal (UE 200) includes a control unit (control unit 270) that, when using a high frequency band having a frequency higher than a certain frequency band including one or a plurality of frequency ranges, maps a physical downlink control channel (PDCCH) across different slots with a physical downlink data channel (PDSCH) that is associated with the physical downlink control channel; and a receiving unit (data transmitting and receiving unit 260) that receives data via the physical downlink data channel associated with the physical downlink control channel across the different slots.

According to still another aspect of the present invention a user terminal (UE 200) includes a control unit (control unit 270) that, when using a high frequency band having a frequency higher than a certain frequency band including one or a plurality of frequency ranges, sets number of consecutive slots used for downlink scheduling different from when using the certain frequency band; and a transmitting unit (control signal processing unit 240) that transmits information indicating the number of consecutive slots to a network.

According to still another aspect of the present invention a user terminal (UE 200) includes a control unit (control unit 270) that, when using a high frequency band having a frequency higher than a certain frequency band including one or a plurality of frequency ranges, reduces number of processes of automatic data retransmission control than when using the certain frequency band; and a transmitting and receiving unit (data transmitting and receiving unit 260) that transmits and receives data based on the automatic data retransmission control with the smaller number of processes.

MODES FOR CARRYING OUT THE INVENTION

Figure 1:
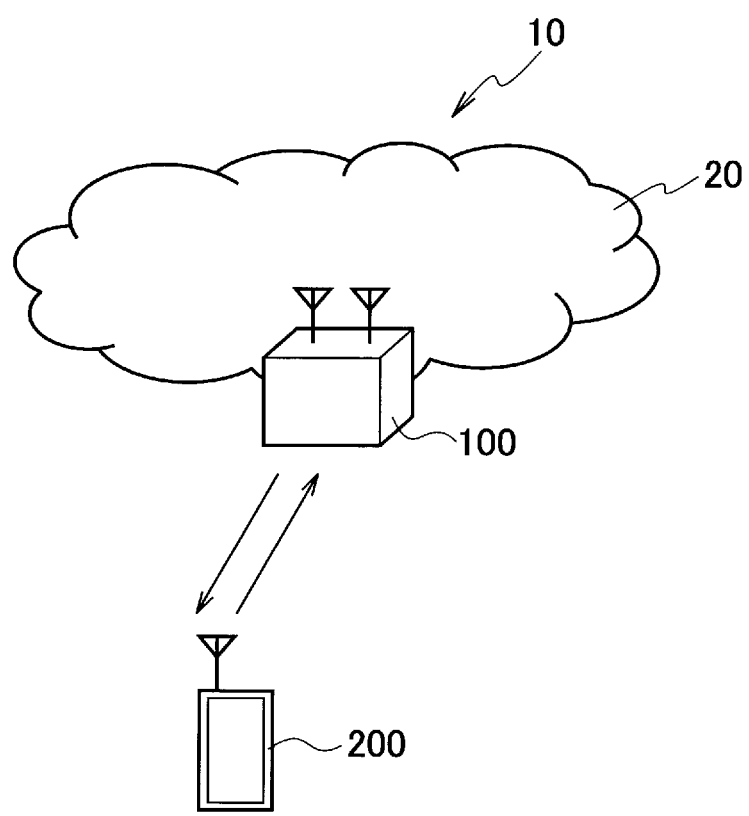
FIG. 1 is an overall schematic configuration diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of Radio Communication System

FIG. 1 is an overall schematic configuration diagram of a radio communication system 10 according to the present embodiment. The radio communication system 10 is a radio communication system according to 5G New Radio (NR). The radio communication system 10 includes Next Generation-Radio Access Network 20 (hereinafter, "NG-RAN 20") and a user terminal 200 (hereinafter, "UE 200").

The NG-RAN 20 includes a radio base station 100 (hereinafter, "gNB 100"). A concrete configuration of the radio communication system 10, including the number of the gNBs and the UEs, is not limited to the example shown in FIG. 1.

The NG-RAN 20 actually includes a plurality of NG-RAN Nodes, in particular, the gNBs (or ng-eNB). Also, the NG-RAN 20 is connected to a core network (5GC, not shown) according to the 5G. The NG-RAN 20 and the 5GC may be simply expressed as "network".

The gNB 100 is a radio base station according to the 5G. The gNB 100 performs a radio communication with the UE 200 according to the 5G. The gNB 100 and UE 200 can handle, by controlling radio signals transmitted from a plurality of antenna elements, a massive MIMO that generate a more directional beam, a carrier aggregation (CA) that uses multiple component carriers (CC), and a dual connectivity (DC) and the like that transmits component carrier simultaneously between several NG-RAN Node and UE.

Figure 2:
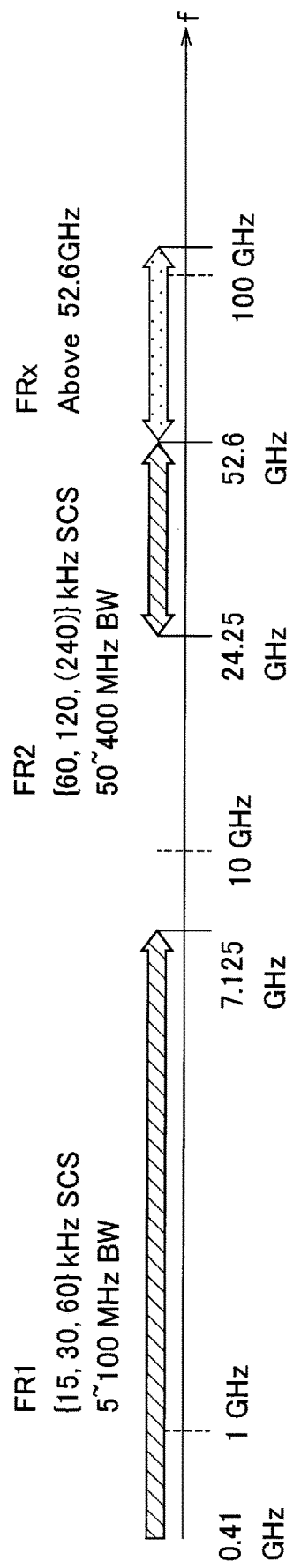
FIG. 2 is a diagram showing a frequency range used in the radio communication system 10.

The radio communication system 10 corresponds to a plurality of frequency ranges (FR). FIG. 2 shows the frequency range used in the radio communication system 10.

As shown in FIG. 2, the radio communication system 10 corresponds to FR1 and FR2. The frequency band of each FR is as below.

FR1: 410 MHz to 7.125 GHz

FR2: 24.25 GHz to 52.6 GHz

In FR1, 15 kHz, 30 kHz, or 60 kHz Sub-Carrier Spacing (SCS) is used, and a bandwidth (BW) of 5 MHz to 100 MHz is used. FR2 has a higher frequency than FR1. Moreover, FR2 uses SCS of 60 kHz or 120 kHz (240 kHz may be included), and uses a bandwidth (BW) of 50 MHz to 400 MHz.

Note that SCS may be interpreted as numerology. The numerology is defined in 3GPP TS38.300 and corresponds to one subcarrier spacing in the frequency domain.

Furthermore, the radio communication system 10 corresponds to FRx (high frequency band) which includes FR1 and FR2 and is a higher frequency than the frequency band of 52.6 GHz or less. FRx belongs to so-called EHF (extremely high frequency, also called millimeter wave). Specifically, FRx is a frequency band exceeding 52.6 GHz and up to 114.25 GHz.

Particularly, as described above, in a high frequency band, an increase in phase noise between carriers becomes a problem. This may require application of a larger (wider) SCS or a single carrier waveform.

Also, a narrower beam (i.e., a larger number of beams) may be required due to increased propagation loss. In addition, since it is more sensitive to PAPR and power amplifier nonlinearity, a greater (wider) SCS (that is, fewer FFT points), a PAPR reduction mechanism, or a single carrier waveform may be required.

In order to solve such a problem, as explained above, when using a band exceeding 52.6 GHz, one approach can be to apply CP-OFDM/DFT-S-OFDM with a larger Sub-Carrier Spacing (SCS). However, the larger the SCS, the shorter the symbol/Cyclic Prefix (CP) period and the slot period (when the 14 symbol/slot configuration is maintained).

Figure 3:
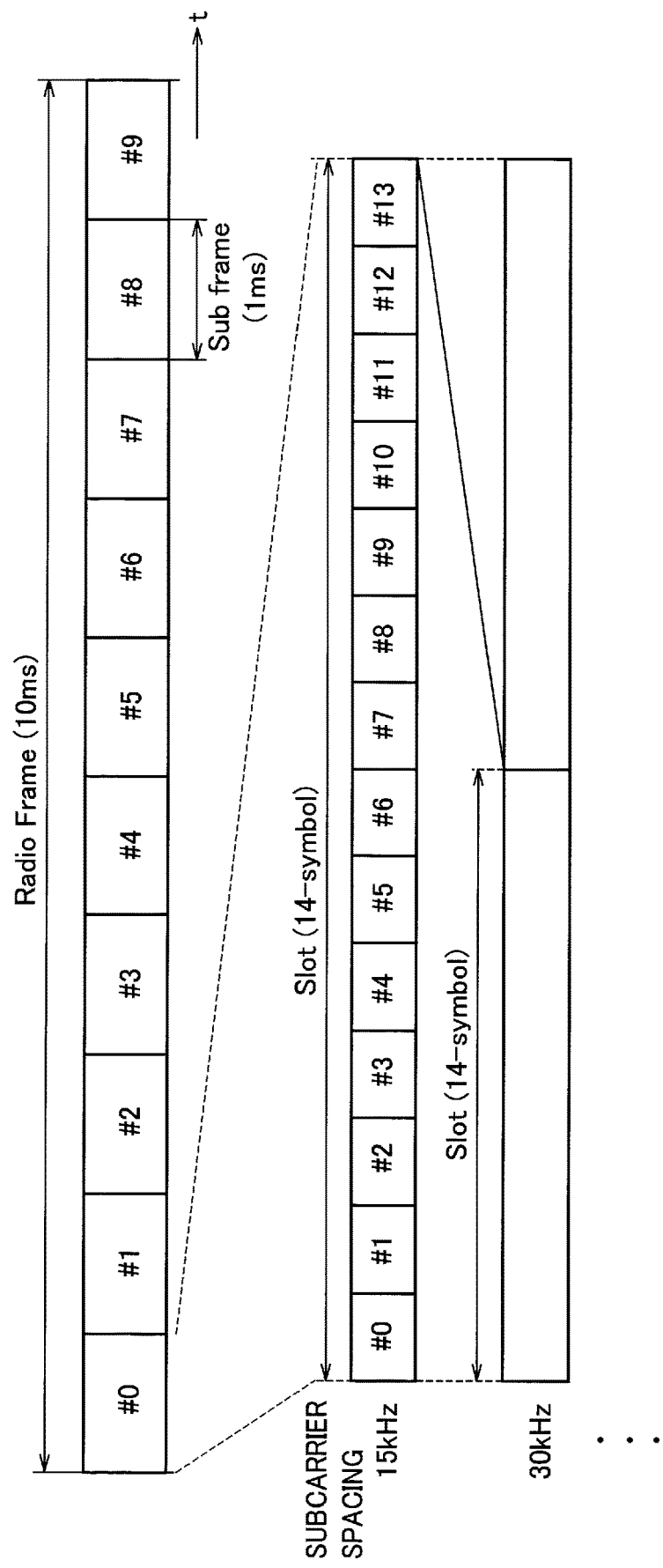
FIG. 3 is a diagram illustrating a configuration example of a radio frame, a subframes, and slots used in the radio communication system 10.

FIG. 3 shows a configuration example of a radio frame, subframes, and slots used in the radio communication system 10. Table 1 shows a relationship between SCS and a symbol period.

TABLE 1

| | SCS | | | | | | |
|---|---|---|---|---|---|---|---|
| | 15 kHz | 30 kHz | 60 kHz | 120 kHz | 240 kHz | 480 kHz | 960 kHz |
| Symbol Period (Unit: µs) | 66.6 | 33.3 | 16.65 | 8.325 | 4.1625 | 2.08125 | 1.040625 |

As shown in Table 1, when the 14 symbol/slot configuration is maintained, the symbol period (and slot period) becomes shorter as the SCS becomes larger (wider).

In the present embodiment, even when the SCS is increased in this way, a mechanism capable of suppressing an increase in cost, complexity, and power consumption of the UE 200 is provided.

(2) Functional Block Configuration of Radio Communication System

Next, a functional block configuration of the radio communication system 10 will be described. Specifically, the functional block configuration of the UE 200 will be described.

Figure 4:
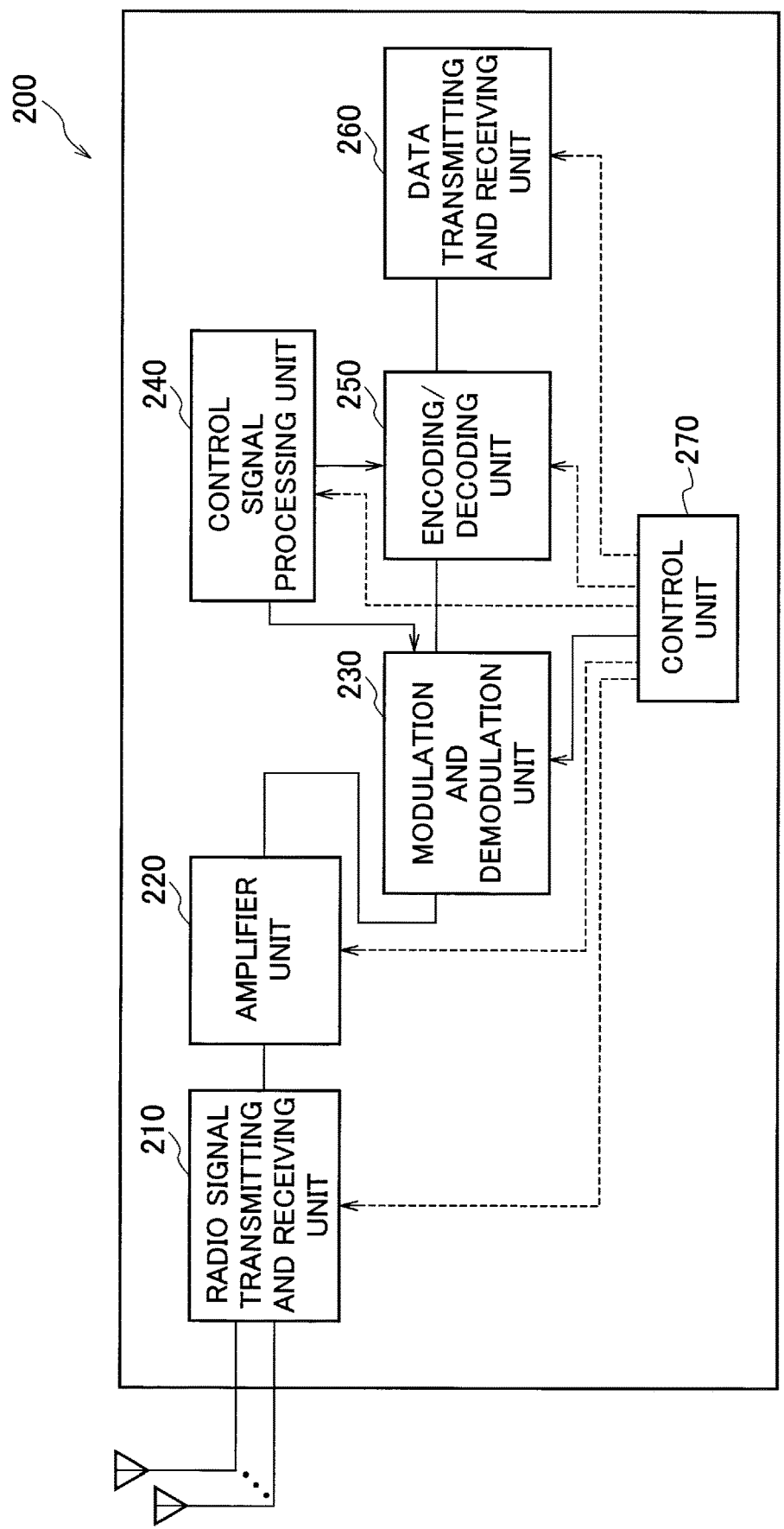
FIG. 4 is a functional block diagram of UE 200.

FIG. 4 is a functional block diagram of the UE 200. As shown in FIG. 4, the UE 200 includes a radio signal transmitting and receiving unit 210, an amplifier unit 220, a modulation and demodulation unit 230, a control signal processing unit 240, an encoding/decoding unit 250, a data transmitting and receiving unit 260, and a control unit 270.

The radio signal transmitting and receiving unit 210 transmits/receives a radio signal according to NR. The radio signal transmitting and receiving unit 210, by controlling radio (RF) signals transmitted from a plurality of antenna elements, handles massive MIMO that produces a more directional beam, carrier aggregation (CA) that uses multiple component carriers (CC), and the dual connectivity (DC) in which component carriers are simultaneously transmitted between multiple NG-RAN Nodes.

Further, the radio signal transmitting and receiving unit 210 may transmit/receive a radio signal using a slot having a larger number of symbols than when FR1 or FR2 is used. Note that the number of symbols is specifically the number of OFDM symbols constituting the slot shown in FIG. 3.

For example, the radio signal transmitting and receiving unit 210 transmits a radio signal by using a slot of 28 symbols/slot or 56 symbols/slot configuration. In the present embodiment, the radio signal transmitting and receiving unit 210 constitutes a transmitting and receiving unit that transmits and receives signals using a slot having a larger number of symbols than when FR1 or FR2 (frequency band) is used.

The amplifier unit 220 includes a Power Amplifier (PA)/Low Noise Amplifier (LNA) or the like. The amplifier unit 220 amplifies the signal output from the modulation and demodulation unit 230 to a predetermined power level. The amplifier unit 220 amplifies the RF signal output from the radio signal transmitting and receiving unit 210.

The modulation and demodulation unit 230 executes data modulation/demodulation, transmission power setting, resource block allocation, and the like for each predetermined communication destination (gNB 100 or other gNB).

The control signal processing unit 240 performs processing related to various control signals transmitted and received by the UE 200. Specifically, the control signal processing unit 240 receives various control signals transmitted from the gNB 100 via a predetermined control channel, for example, radio resource control layer (RRC) control signals. In addition, the control signal processing unit 240 transmits various control signals to the gNB 100 via a predetermined control channel.

In the present embodiment, the control signal processing unit 240 can receive the PDCCH based on PDCCH monitoring occasion (monitoring interval) of the PDCCH (Physical Downlink Control Channel) that is larger than when FR1 or FR2 is used. In the present embodiment, the control signal processing unit 240 configures a receiving unit that receives a physical downlink control channel based on the monitoring interval of the physical downlink control channel that is larger than when FR1 or FR2 (frequency band) is used.

In the present embodiment, when using FRx (see FIG. 2), the control signal processing unit 240 transmits, which case is different from the case of using FR1 or FR2, information indicating the number of consecutive slots used for downlink scheduling.

Specifically, the control signal processing unit 240 reports to the network (NG-RAN 20 or 5GC) information indicating the number of consecutive slots (capability information) as the capability of the UE 200. In the present embodiment, the control signal processing unit 240, when using FRx (high frequency band) that is a higher frequency than FR1 or FR2 (frequency band), which case is different from the case of using FR1 or FR2, constitutes a transmitting unit that transmits to the network the number of continuous slots used for downlink scheduling.

The encoding/decoding unit 250 executes data division/concatenation and channel coding/decoding for each predetermined communication destination (gNB 100 or other gNB).

Specifically, the encoding/decoding unit 250 divides the data output from the data transmitting and receiving unit 260 into pieces of a predetermined size, and performs channel coding on the pieces of the data. The encoding/decoding unit 250 decodes the data output from the modulation and demodulation unit 230 and connects the decoded data.

The data transmitting and receiving unit 260 transmits and receives Protocol Data Unit (PDU) and Service Data Unit (SDU). Specifically, the data transmitting and receiving unit 260 executes PDU/SDU assembly/disassembly and the like in multiple layers (such as medium access control layer (MAC), radio link control layer (RLC), and packet data convergence protocol layer (PDCP)). The data transmitting and receiving unit 260 performs data error correction and retransmission control based on hybrid ARQ (Hybrid automatic repeat request).

In the present embodiment, the data transmitting and receiving unit 260, when FRx is used, can transmit a transport block (TB) mapped to a plurality of slots. That is, in the present embodiment, when FRx is used, one TB can be mapped across a plurality of slots instead of one slot. In the present embodiment, the data transmitting and receiving unit 260 constitutes a transmitting unit that transmits transport blocks mapped to a plurality of slots.

Also, in the present embodiment, as described later, when FRx is used, PDCCH and PDSCH (Physical Downlink Shared Channel) associated with the PDCCH can be mapped across different slots. In such a case, the data transmitting and receiving unit 260 can receive data via the PDSCH associated with the PDCCH across different slots. In the present embodiment, the data transmitting and receiving unit 260 constitutes a receiving unit that receives data via a physical downlink data channel associated with a physical downlink control channel across different slots.

Furthermore, in the present embodiment, as will be described later, when FRx is used, the number of HARQ processes may be smaller than when FR1 or FR2 is used. In such a case, the data transmitting and receiving unit 260 operates HARQ having a small number of processes to transmit and receive data. In the present embodiment, the data transmitting and receiving unit 260 constitutes a transmitting and receiving unit that transmits and receives data based on automatic data retransmission control having a small number of processes.

The control unit 270 controls each functional block constituting the UE 200. Hereinafter, an outline of the functions of the control unit 270 will be described. Details of the operations of the UE 200 executed by the control unit 270 will be described later.

In the present embodiment, the control unit 270, when using one or more frequency ranges, specifically, FRx (high frequency band) that is higher than the frequency band including FR1 or FR2, can increase the number of symbols constituting one slot (the number of OFDM symbols) than when using FR1 or FR2.

For example, the control unit 270 can be changed from a 14 symbol/slot configuration to a 28 symbol/slot or symbol/slot configuration. The number of symbols constituting one slot may be specified directly by a numerical value or may be specified in the form of N*14. N is an integer and is preferably a power of 2 ($2^N$).

Moreover, the control unit 270, when using FRx, can make the monitoring interval of the PDCCH (physical downlink control channel) longer than when using FR1 or FR2.

Specifically, the control unit 270 can define the UE capability for PDCCH monitoring having a larger minimum gap than when using FR1 or FR2. For example, the control unit 270 may define only PDCCH monitoring at the slot level, or multiple slot levels, rather than multiple times within a slot.

Further, the control unit 270, when using FRx, can map one transport block (TB) to a plurality of slots. Specifically, the control unit 270, when using FRx, can map one TB across a plurality of slots instead of one slot. The TB can include one or a plurality of data units (PDU: Protocol Data Unit), and the data unit (for example, MAC-PDU) may be interpreted as the same as the TB.

The control unit 270 may map one TB to a plurality of consecutive slots or may map one TB to a plurality of non-consecutive slots.

Further, when using FRx, the control unit 270 can map the PDCCH and the PDSCH associated with the PDCCH across different slots.

Specifically, the control unit 270 performs scheduling of the PDCCH and the PDSCH specified by the PDCCH in different slots (may be referred to as cross-slot scheduling). In this case, PDCCH and PDSCH may be mapped (assigned) to adjacent slots or non-adjacent slots, that is, one or more slots may be present between PDCCH slot and PDSCH slot.

Also, when using FRx, the control unit 270 can set, which case is different from when using FR1 or FR2, the number of consecutive slots used for downlink scheduling. Specifically, the control unit 270 determines the maximum number of consecutive slots used for downlink scheduling and notifies NG-RAN 20 (or 5GC) of information indicating the determined number of consecutive slots.

The notification of the number of consecutive slots is typically obtained by using upper layer signaling (for example, RRC); however, a lower layer (for example, MAC) control signal may be used.

Also, when using FRx, the control unit 270 can reduce the number of HARQ (automatic data retransmission control) processes compared to when using FR1 or FR2.

Specifically, when using FR1 or FR2, to improve throughput, while waiting for an acknowledgment from one HARQ process, the UE 200 can run up to 16 HARQ processes at the same time to send data to another HARQ process; however, when using FRx, the control unit 270 reduces (relaxes) the maximum number of HARQ processes.

For example, the control unit 270 can reduce the number of HARQ processes that can operate simultaneously to 4 or 8 or the like.

(3) Operation of Radio Communication System

Next, the operation of the radio communication system 10 will be described. In present embodiment, as explained above, the radio communication system 10 uses FRx (see FIG. 2) which is a frequency band exceeding 52.6 GHz and up to 114.25 GHz. The UE 200 supports expansion of downlink scheduling when such a high frequency band is used. Hereinafter, the details of the problem when the Sub-Carrier Spacing (SCS) becomes large and the slot period becomes short will be described in detail, and the operation of the UE 200 that can solve the problem will be specifically described.

(3.1) Issues when Slot Period is Shortened

Figure 5:
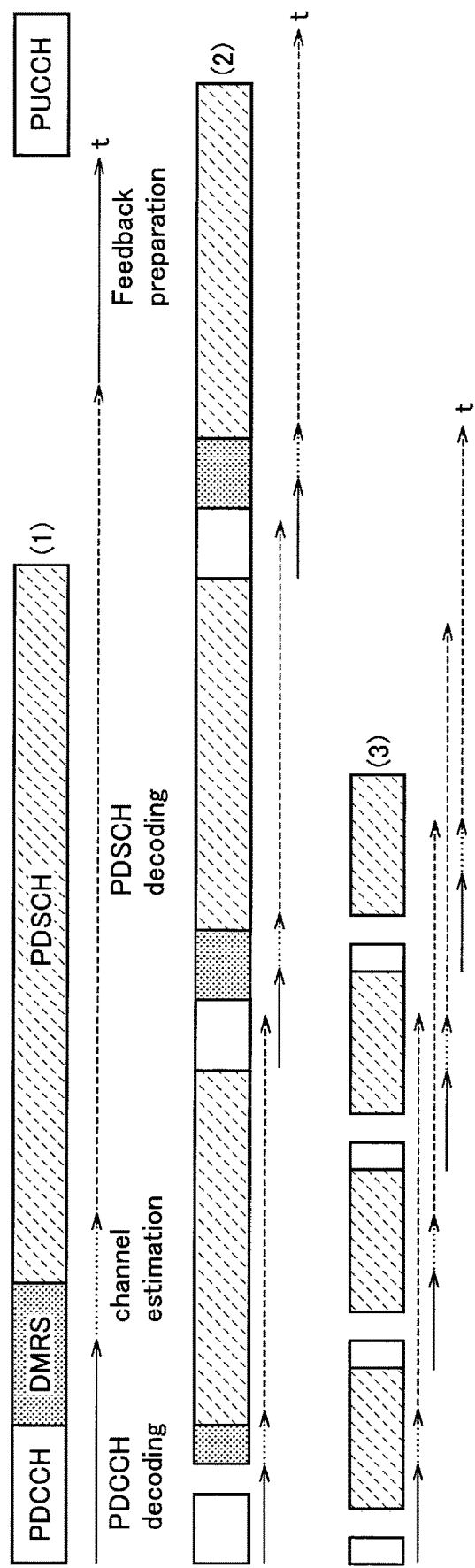
FIG. 5 is an explanatory diagram of problems arising when a sub-carrier spacing (SCS) is increased and a slot period is shortened.

FIG. 5 is an explanatory diagram of problems when the sub-carrier spacing (SCS) is increased and the slot period is shortened. As shown in FIG. 5, PDCCH, a demodulation reference signal (DMRS), and PDSCH are sequentially allocated in the slot (see FIG. 3). Moreover, the UE 200 prepares feedback to the gNB 100 and executes uplink transmission using the PUCCH (Physical Uplink Control Channel).

The UE 200 sequentially receives the PDCCH, DMRS, and PDSCH transmitted from the gNB 100, and sequentially executes the PDCCH decoding, channel estimation by using the DMRS, and decoding processing of the PDSCH (see arrows in the figure). As indicated by the length of the arrow, each process takes a certain amount of time.

As shown in (2) and (3) of FIG. 5, when the slot period is shorter as compared with (1), the time that the UE 200 can spend for each process is also shortened.

Therefore, if the UE 200 has been scheduled in multiple consecutive slots, when the UE 200 needs to start processing the second slot, processing of the first slot may not be completed (see the part where the arrows in the figure overlap in the time direction). In such a case, the UE 200 must execute parallel processing, and the shorter the slot period, the greater the number of parallel processes.

For this reason, the UE 200 is required to have such parallel processing capability. However, this causes an increase in the cost, complexity, and power consumption of the UE 200.

To address this issue, the UE 200 according to the present embodiment supports scalable Numerology (SCS) in the case of using FRx.

(3.2) Operation Example

In the present embodiment, when using FRx, at least one of the following Options 1 to 6 that can solve the above-described problems is applied.

Option 1: Change slot definition from 14 symbols to >14 symbols

Option 2: Define UE capabilities for PDCCH monitoring with minimum gap greater than FR1/FR2 (e.g. slot level or multi-slot level PDCCH monitoring only)

Option 3: Support single TB mapping to multiple slots

Option 4: Define cross-slot scheduling (assignment of PDCCH and PDSCH to different slots) as default Option 5: Define UE capability reporting indicating maximum number of consecutive slots for downlink scheduling Option 6: Relax the number of required HARQ processes The UE 200 can operate according to one, a combination thereof, or all of Options 1 to 6.

(3.2.1) Option 1

In this option, the slot definition is changed from 14 symbols to >14 symbols, that is, the number of ODFM symbols constituting one slot is set to 15 symbols or more. OFDM symbol is a unit of data to be transmitted, and is composed of a plurality of subcarriers in the case of OFDM. CP is inserted at the head of each symbol.

Specifically, the slot configuration is defined as N*14 symbols (for example, 28 symbols, 56 symbols, etc.). As explained above, N is an integer and is preferably a power of 2 ($2^N$). The value of N may be defined in advance, or may be specified from the network each time FRx is used.

Figure 6A:
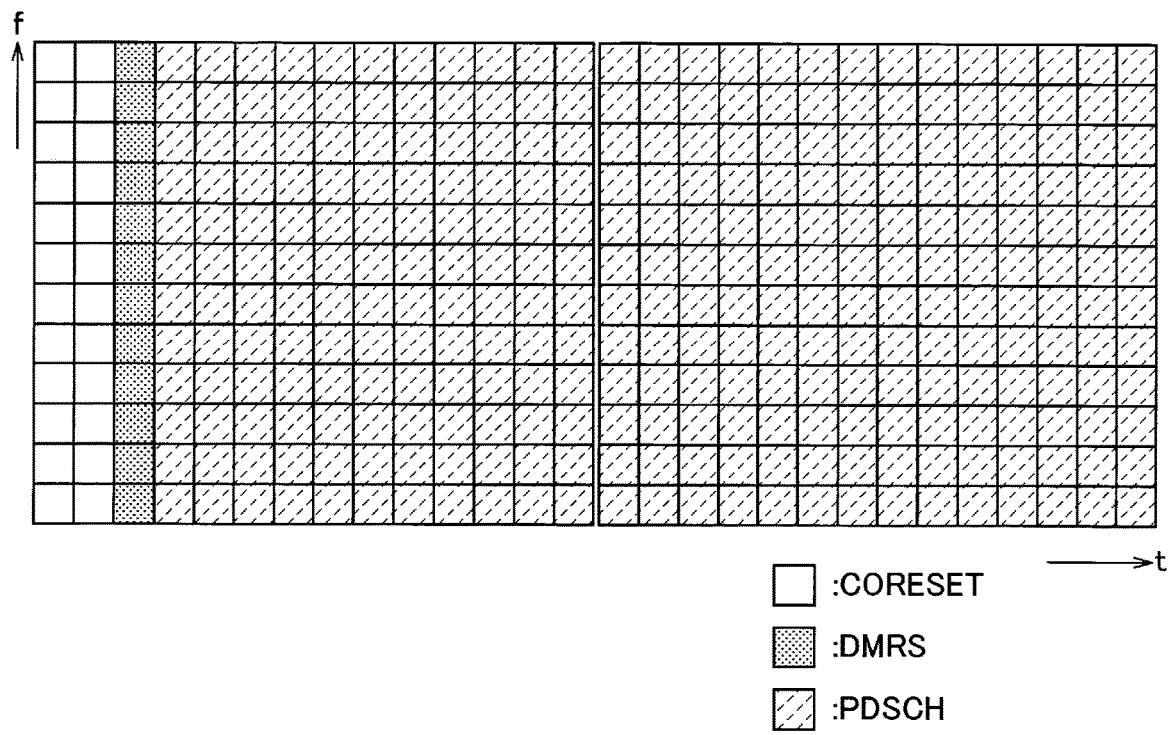
FIG. 6A is a diagram showing a configuration example (part 1) of a slot according to Option 1.
Figure 6B:
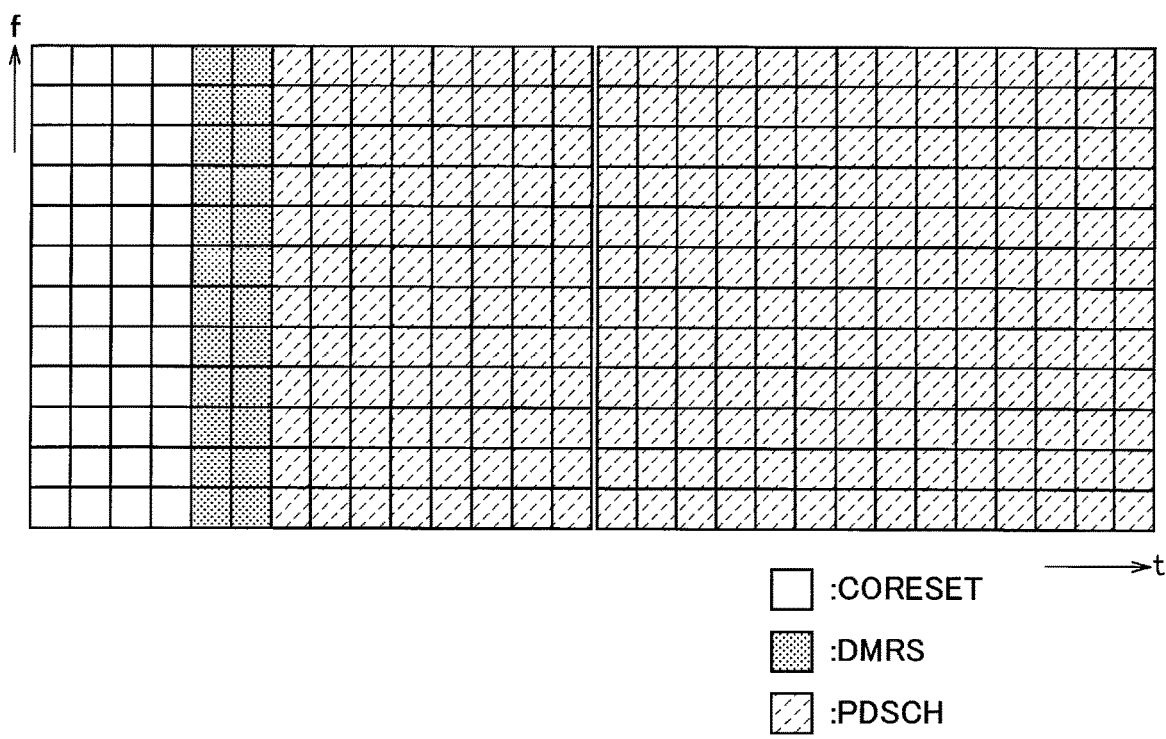
FIG. 6B is a diagram showing a configuration example (part 2) of the slot according to Option 1.

FIGS. 6A and 6B show a configuration example of a slot according to Option 1. In order to map the reference signal (DMRS) and various channels to the extended slot, at least one of the following changes is necessary.

CORESET (control resource sets) symbol number candidate values support values greater than 3 (up to N times 3) (for example, up to 6 symbols for 28 symbols/slot)

PDSCH DMRStype A (MIB dmrs-TypeA-position) symbol index candidate values are different from those for FR1/FR2 (for example, #6, 7 for #2, 3 for FR1/FR2, etc.)

Candidate positions for additional DMRS for PDSCH differ from those in FR1/FR2 (for example, additional DMRS may exist after symbol #13 (see FIG. 3))

CSI-RS (firstOFDMSymbolInTimeDomain) candidate positions support positions exceeding #13

PDSCH time domain resource allocation pattern (SLIV: Start and Length Indicator Value) candidates are different from those in FR1/FR2 (for example, a larger starting position and/or length may be applied)

As in TDD-UL-DL-Config, DL/UL/Flexible candidate symbols support a larger value than FR1/FR2.

Also, in the case of this option, the following alternative approach may be applied.

For at least some specific reference signals/channels, all (or some) are simply multiplied by N (the candidate values/configuration of all reference signals/channels is not changed individually)

Furthermore, resource allocation is every N symbols (not every symbol). That is, for such an alternative approach, the granularity is coarser than the content of this option described above.

Alternatively, in the case of this option, another possible change is that the number of subcarriers per Physical Resource Block (PRB) may be less than 12. For this reason, the total number of REs (Resource Elements) in the PRB/slot is the same as in the case of FR1/FR2 (that is, 168). As a result, even when expanded to 28 symbols/slot, the aspect ratio of the radio resource in the time direction and the frequency direction can approach the case of FR1/FR2.

FIGS. 6A and 6B show examples of arrangement of the CORESET symbol (PDCCH), DMRS, and PDSCH in a 28 symbol/slot configuration.

In FIG. 6A, the time domain resource allocation (TDRA) for PDSCH is only expanded. On the other hand, in FIG. 6B, the number of CORESET symbols, the position and number of DMRS, and the TDRA of PDSCH are expanded.

(3.2.2) Option 2

This option defines the UE capability for PDCCH monitoring with a minimum gap greater than FR1/FR2.

For example, as explained above, the UE 200 performs slot-level or multi-slot level PDCCH monitoring instead of multiple times in a slot.

Figure 7:
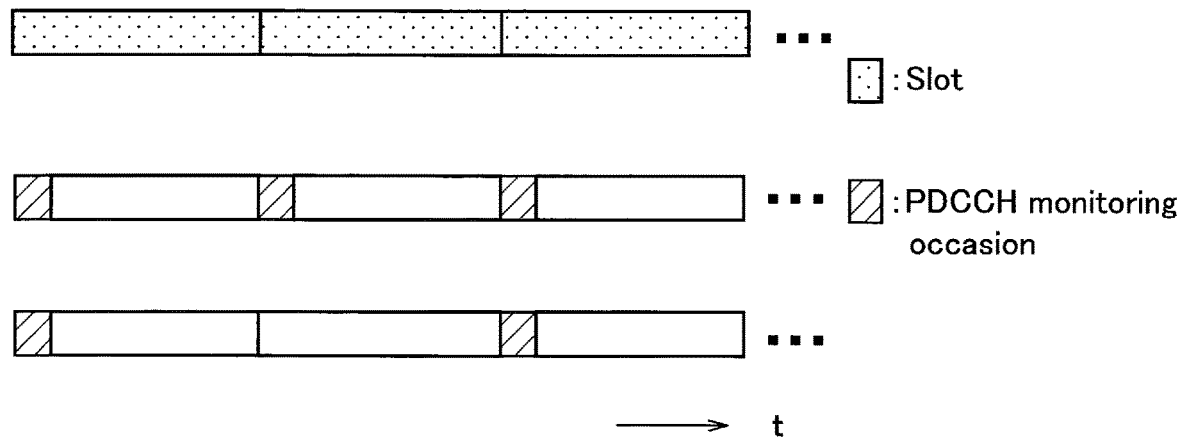
FIG. 7 is a diagram showing an example of PDCCH monitoring occasion in Option 2.

FIG. 7 shows an example of PDCCH monitoring occasion in Option 2.

In the case of this option, one, a combination thereof, or all of the following examples can be applied.

Example 1: Use a report value of pdcch-MonitoringAnyOccasionsWithSpanGap (see 3GPP TS38.331) different from FR1/FR2.

Example 2: A value set of pdcch-MonitoringAnyOccasionsWithSpanGap is changed from FR1/FR2 (unlike Example 1, the value set configuration is changed)

Example 3: Defining new signaling for the minimum gap length between PDCCH monitoring occasions (monitoring intervals)

Example 4: Support for multiple PDCCH monitoring occasions in a slot is not defined, and the minimum gap between PDCCH monitoring occasions is defined as one slot (see the middle part of FIG. 7)

Example 5: Support of PDCCH monitoring occasions in all slots is not defined, and the minimum gap between PDCCH monitoring occasions is defined as >1 slot, that is, two slots or more (see the lower part of FIG. 7) That is, in the case of Example 5, the PDCCH monitoring occasion arrives once every several slots.

(3.2.3) Option 3

This option supports single TB mapping to multiple slots. In this option, single downlink control information (DCI) is used to schedule one (single) TB in multiple slots.

Figure 8:
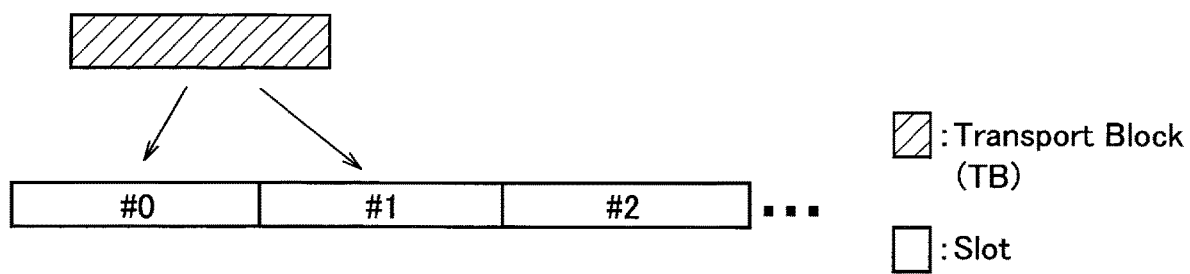
FIG. 8 is a diagram showing a mapping example of single TB to a plurality of slots in Option 3.

FIG. 8 shows an example of a single TB mapping to multiple slots in Option 3.

Such scheduling of PDSCH to multiple slots (multi-slot PDSCH scheduling) is preferably defined as "default" when FRx is used. That is, this can be called mapping TB to a single slot. Scheduling PDSCH to a single slot is preferably made optional (Example 1).

Alternatively, PDSCH scheduling to a single slot may be applied only when explicitly instructed by the scheduling DCI (Example 2).

Also, the PDSCH time domain resource allocation pattern (SLIV) candidates may be different from those in FR1/FR2. For example, in the case of SLIV value having a larger length, the candidate SLIV may be different from that in FR1/FR2.

Particularly, in the second and subsequent slots, the reference signal (RS) mapping may be different from that in FR1/FR2. For example, PDSCH DMRS may be located only in the first slot, and PTRS (Phase Tracking Reference Signal) mapping may be located in a plurality of slots.

(3.2.4) Option 4

In this option, cross-slot scheduling (assignment of PDCCH and PDSCH to different slots) is defined as a default.

The cross-slot scheduling is also defined in Release 15; however, this option is preferably defined as "default" when FRx is used.

Figure 9:
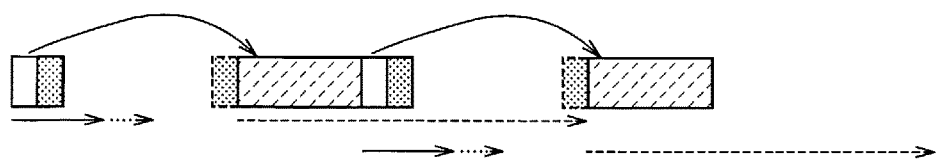
FIG. 9 is a diagram showing an example of cross-slot scheduling in Option 4.

FIG. 9 shows an example of cross-slot scheduling in Option 4. As shown in FIG. 9, the PDSCH associated with the PDCCH is scheduled in different slots. Also, the straight arrows in the figure correspond to PDCCH (CORESET) decoding by the UE 200, channel estimation using DMRS, and PDSCH decoding processing, as in FIG. 5.

When using FRx, the slot offset between PDCCH and PDSCH, that is, the default value of k0 of PDSCH-TimeDomainResourceAllocation can be changed from 0 to >0. When using FRx, support for k0=0 may be optional. In addition, the candidate value of k0 may be different from that in FR1/FR2. Note that k0=0 may be deleted from the candidate value.

Also, PDSCH DMRS can be transmitted by a slot including PDCCH and/or a slot including PDSCH. For example, such a setting can be dynamically indicated by RRC signaling, MAC-CE (Control Element), or downlink control information (DCI). Alternatively, as a limitation when using FRx, the same Transmission Configuration Indication (TCI) state (Quasi Co-Location (QCL) property) may be applied between the PDCCH and the PDSCH (i.e., PDCCH DMRS is made available in demodulation of PDSCH).

(3.2.5) Option 5

This option defines UE capability report indicating the maximum number of consecutive slots for downlink scheduling.

This option is similar but different from Option 2. Specifically, the PDCCH monitoring may be performed frequently, but scheduling to consecutive slots depends on the UE capability (relaxed compared to FR1/FR2). In other words, support for reception capability corresponding to scheduling to consecutive slots may be optional. The UE 200 reports to the network the appropriate maximum number of consecutive slots according to the UE 200 capability.

Also, the UE 200 can report to the network the maximum number of consecutive slots for downlink scheduling. Note that, when the UE 200 has reported the maximum number of consecutive slots N to the network, and if it is already scheduled in the consecutive N slots, the UE 200 may expect not to be scheduled in the next slot.

Figure 10:
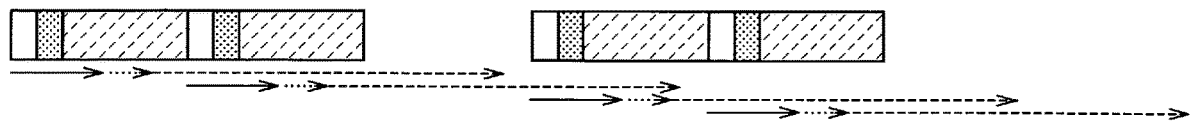
FIG. 10 is a diagram showing an example of downlink scheduling in Option 5.

FIG. 10 shows an example of downlink scheduling in Option 5. As shown in FIG. 10, when the UE 200 has reported to the network that the maximum number of consecutive slots N is 2, the UE 200 is not scheduled in the slot after being scheduled to two consecutive slots (see the gap between the end of PDSCH and the beginning of the CORESET in the figure).

(3.2.6) Option 6

Figure 11:
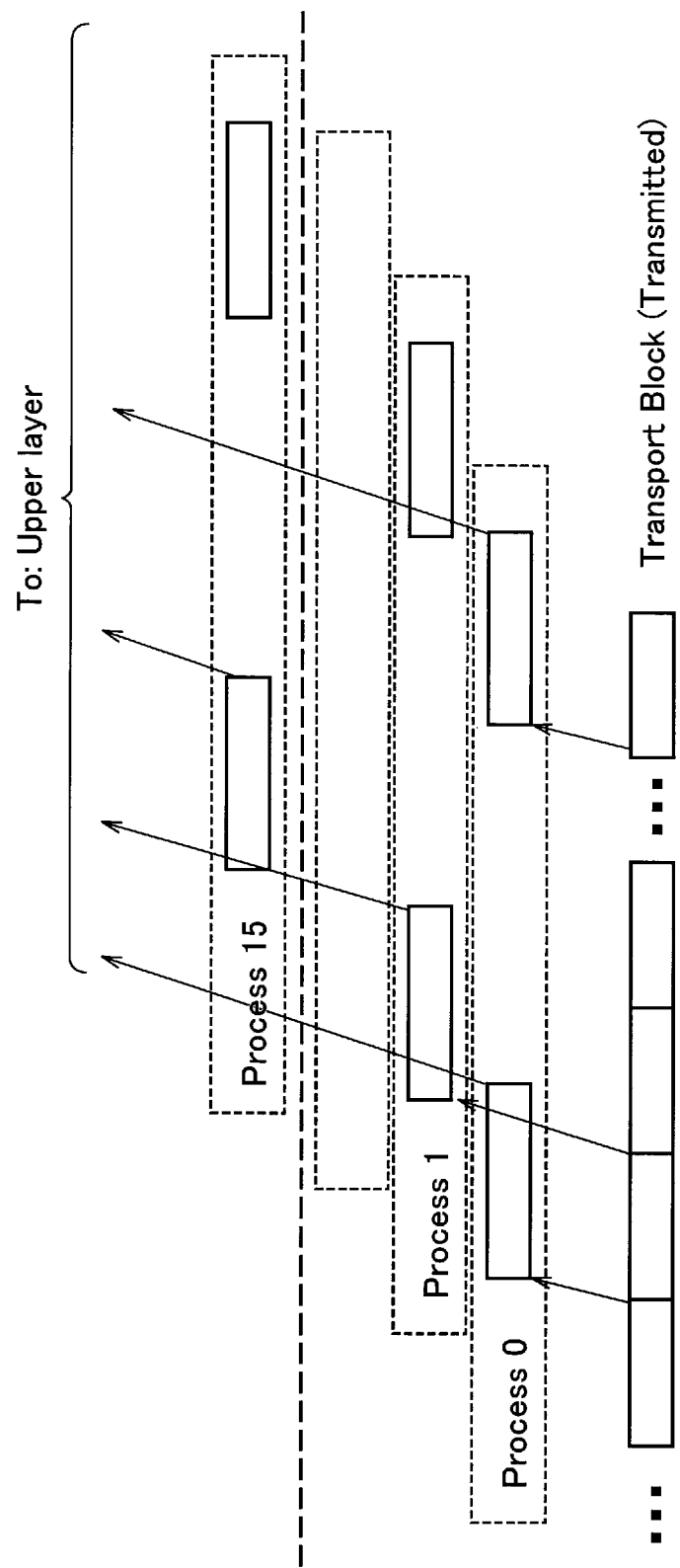
FIG. 11 is a diagram showing an example of mitigating the number of HARQ processes in Option 6.

In this option, the number of required HARQ processes is reduced. FIG. 11 shows an example of mitigating the number of HARQ processes in Option 6.

As explained above, to improve the throughput, HARQ operates up to 16 HARQ processes at the same time so that the sender can send data to another HARQ process while waiting for an acknowledgment from one HARQ process. In this option, the maximum number of HARQ processes is reduced.

For FR1/FR2, it is essential to support up to 16 HARQ processes per serving cell. In this option, when using FRx, the required HARQ process is relaxed and reduced to less than 16.

For example, when using FRx, the number of HARQ processes per serving cell may be reported as UE capability, and 16 may not be included in the option or candidate values. Further, when using FRx, the UE 200 may support a number less than 16 (below the dotted line in the figure), for example, 8 HARQ processes.

Also, the candidate value of nrofHARQ-Processes-ForPDSCH (see 3GPP TS38.331) in PDSCH-ServingCell-Config may be different from the candidate value in FR1/FR2. For example, the value 16 may be deleted.

(4) Advantageous Effects

According to the embodiments described above, the following advantageous effects can be obtained. Specifically, according to the UE 200, when using FRx, the number of symbols (the number of OFDM symbols) constituting one slot can be increased (Option 1) as compared with the case of using FR1 or FR2.

For this reason, in order to use FRx, if a larger Sub-Carrier Spacing (SCS) is applied and the symbol period becomes extremely short, the UE 200 is scheduled in a plurality of consecutive slots, and when it is necessary to start the processing of the second slot, the possibility that the processing of the first slot is not completed can be reduced.

In other words, according to the UE 200, even when a high frequency band exceeding 50 GHz is used, an opportunity that requires parallel processing can be avoided or reduced, and an increase in the cost, complexity, and power consumption can be suppressed.

In the present embodiment, when using FRx, the UE 200 can increase the monitoring interval of PDCCH (physical downlink control channel) compared to when using FR1 or FR2 (Option 2).

Further, when using FRx, the UE 200 can map one transport block (TB) to a plurality of slots (Option 3). Furthermore, when using FRx, the UE 200 can map the PDCCH and the PDSCH associated with the PDCCH across different slots (Option 4).

Also, when using FRx, different from the case of using FR1 or FR2, the UE 200 can set the number of consecutive slots used for downlink scheduling (Option 5). Furthermore, when using FRx, the UE 200 can reduce the number of HARQ (automatic data retransmission control) processes compared to when using FR1 or FR2 (Option 6).

For this reason, as in Option 1, even when a high frequency band exceeding 50 GHz is used, the opportunity for parallel processing can be avoided or reduced, and an increase in the cost, complexity, and power consumption can be suppressed.

(5) Other Embodiments

Although the contents of the present invention have been described by way of the embodiments, it is obvious to those skilled in the art that the present invention is not limited to what is written here and that various modifications and improvements thereof are possible.

For example, in the above-described embodiments, the contents of Options 1 to 6 are sequentially described; however, as explained above, the UE 200 may execute one of Options 1 to 6, a combination thereof, or can simultaneously execute all the options.

In the above-described embodiments, FRx is premised on a frequency exceeding 52.6 GHz; however, FRx may be 52.6 GHz or less. In this case, the upper limit of FR2 may be lower than 52.6 GHz.

Moreover, the block diagram used for explaining the embodiments (FIG. 4) shows blocks of functional unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 12:
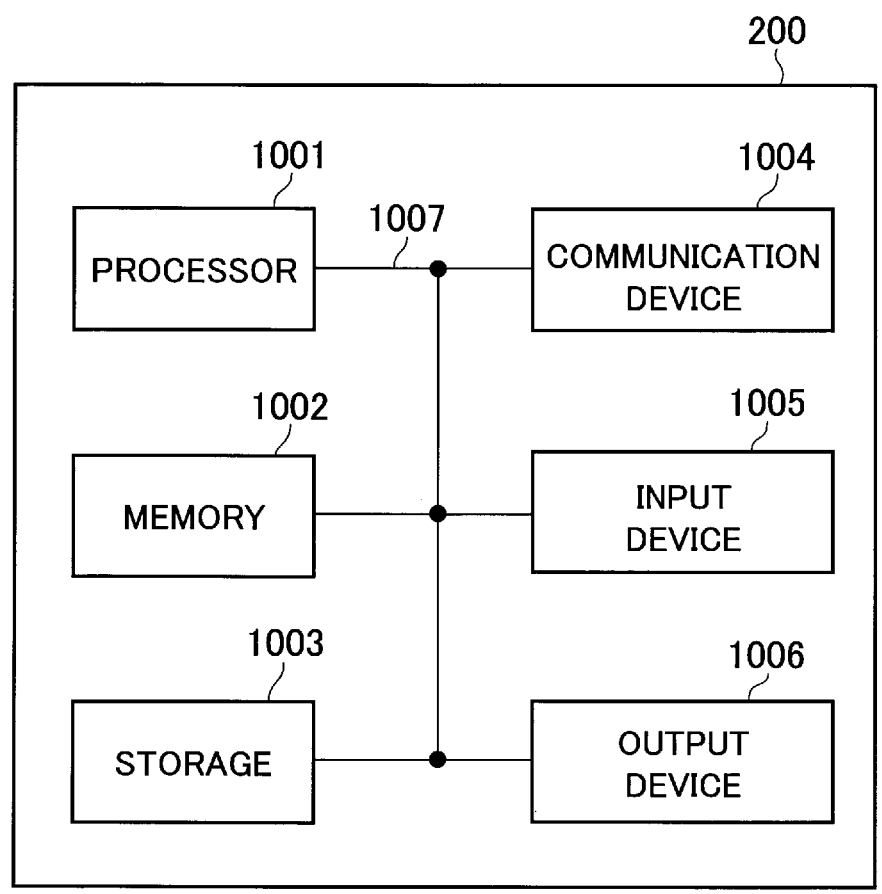
FIG. 12 is a diagram illustrating an example of a hardware configuration of the UE 200.

Furthermore, the UE 200 explained above can function as a computer that performs the processing of the radio communication method of the present disclosure. FIG. is a diagram showing an example of a hardware configuration of the UE 200. As shown in FIG. 12, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

The functional blocks of the UE 200 (see FIG. 4) can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the UE 200 by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main memory), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, notification information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
200 UE
210 Radio signal transmitting and receiving unit
220 Amplifier unit
230 Modulation and demodulation unit
240 Control signal processing unit
250 Encoding/decoding unit
260 Data transmitting and receiving unit
270 Control unit
1001 Processor
1002 Memory
1003 Storage
1004 Communication device
1005 Input device
1006 Output device
1007 Bus

The invention claimed is:

1. A terminal comprising:
a processor that, when using a high frequency band having a frequency higher than a certain frequency band including one or a plurality of frequency ranges, increases a monitoring interval of a physical downlink control channel than when using the certain frequency band;
a receiver that receives the physical downlink control channel based on the monitoring interval that is larger than when using the certain frequency band; and
a transmitter that transmits a terminal capability for monitoring of the physical downlink control channel having a minimum gap of the monitoring interval.

2. A radio communication method comprising:
when using a high frequency band having a frequency higher than a certain frequency band including one or a plurality of frequency ranges, increasing a monitoring interval of a physical downlink control channel than when using the certain frequency band;
receiving the physical downlink control channel based on the monitoring interval that is larger than when using the certain frequency band; and
transmitting a terminal capability for monitoring of the physical downlink control channel having a minimum gap of the monitoring interval.

* * * * *